United States Patent
Yu et al.

(10) Patent No.: US 10,636,003 B2
(45) Date of Patent: Apr. 28, 2020

(54) SYSTEM AND METHOD FOR NONINTRUSIVE COMMISSIONING OF ELEMENTS TO AN INDOOR POSITIONING SYSTEM

(71) Applicant: Current Lighting Solutions, LLC, East Cleveland, OH (US)

(72) Inventors: Roger Tse Kin Yu, San Ramon, CA (US); Leslie Fokou, San Ramon, CA (US); David Shilling, Cleveland, OH (US); Lokesh Babu Krishnamoorthy, San Ramon, CA (US); Durgaprasad Kumar Poovalingam, San Ramon, CA (US)

(73) Assignee: CURRENT LIGHTING SOLUTIONS, LLC., East Cleveland, OH (US)

( * ) Notice: Subject to any disclaimer, the term of this patent is extended or adjusted under 35 U.S.C. 154(b) by 520 days.

(21) Appl. No.: 15/418,793

(22) Filed: Jan. 30, 2017

(65) Prior Publication Data
US 2017/0286889 A1   Oct. 5, 2017

Related U.S. Application Data

(60) Provisional application No. 62/317,439, filed on Apr. 1, 2016.

(51) Int. Cl.
*H05B 35/00* (2006.01)
*G06Q 10/06* (2012.01)
(Continued)

(52) U.S. Cl.
CPC ... *G06Q 10/063114* (2013.01); *H04B 10/116* (2013.01); *H04B 10/1149* (2013.01); *H05B 37/0272* (2013.01); *Y02B 20/48* (2013.01)

(58) Field of Classification Search
None
See application file for complete search history.

(56) References Cited

U.S. PATENT DOCUMENTS

| 9,055,200 | B1 | 6/2015 | Ganick et al. |
| 2012/0206050 | A1* | 8/2012 | Spero ............... B60Q 1/04 315/152 |

(Continued)

FOREIGN PATENT DOCUMENTS

WO   WO-2016124424 A1 *  8/2016  ......... H04L 63/0892

*Primary Examiner* — Thomas L Mansfield
(74) *Attorney, Agent, or Firm* — Buckley, Maschoff & Talwalkar LLC

(57) ABSTRACT

A system for commissioning a smart luminaire (122A, 122B) in an indoor positioning system (100) includes a mobile device (110) including a mobile device control processor (112) in communication with a commissioning application (117), the commissioning application configured to communicate with one or more position beacons (120A, 120B) distributed throughout a spatial volume of a structure, the one or more position beacons configured to broadcast a unique identifier within the spatial volume via a wireless communication protocol, and to receive a transmission from the mobile device; a wireless transceiver (118) in the mobile device configured to receive the broadcasted positions, and to transmit data to the one or more position beacons, and the commissioning application configured to authenticate itself to the position beacon, and to programmatically change the unique identifier. A method for commissioning smart luminaires and a non-transitory computer-readable medium containing executable instructions is also disclosed.

22 Claims, 3 Drawing Sheets

(51) Int. Cl.
*H04B 10/116* (2013.01)
*H04B 10/114* (2013.01)
*H05B 37/02* (2006.01)

(56) References Cited

U.S. PATENT DOCUMENTS

2015/0098709 A1* 4/2015 Breuer .................. G01C 3/08
                                                          398/118
2018/0018473 A1* 1/2018 Knibbe ............... H04L 63/0892

* cited by examiner

SYSTEM AND METHOD FOR NONINTRUSIVE COMMISSIONING OF ELEMENTS TO AN INDOOR POSITIONING SYSTEM

CLAIM OF PRIORITY

This patent application claims the benefit of priority, under 35 U.S.C. § 119, of U.S. Provisional Patent Application Ser. No. 62/317,439, filed Apr. 1, 2016 titled "Multiple Aspects Relating to Indoor Positioning," the entire disclosure of which is incorporated herein by reference.

BACKGROUND

An indoor positioning system (IPS) is a system to locate objects or people inside of a structure (e.g., a building, garage, mine, etc.) using a variety of technologies that can locate mobile devices (e.g., RF identification tags, mobile phones, mobile devices, etc.) appended and/or associated with objects, or in the possession of a person moving about the structure. An IPS can provide organizations with the detailed behavior and interaction of people, assets and inventory within the structure, while achieving a high location accuracy. For example, an IPS can be used at a construction site to track the locations of personnel, materials, and machinery.

Prior methods of commissioning a lighting fixture to the IPS can require many manual steps. For example, commissioning communications can be manually entered via a user interface application running on the computer. The LED luminaire would need to be connected to a computer. The user interface can communicate with the luminaire through pre-compiled firmware program instructions. Entry of the communications is typically done in hexadecimal.

Access to the luminaire first requires manual entry of a password. In order to associate code words to luminaires on a map, the luminaires are first installed sequentially through the structure based on preexisting code words in the luminaire. Then, manual editing of a data file for the IPS is performed to assign these sequential code words to the position of the luminaires on a floorplan and/or map of the structure.

Subsequently, in order to modify the data broadcast by a luminaire, the luminaire would need to be connected to a computer (typically via a USB port). To make the connection, the luminaire could need to be removed from its installation in the structure—e.g., wall, ceiling, etc. The modified data could then be manually entered via the user interface through the pre-compiled firmware program instructions using hexadecimal data.

DETAILED DESCRIPTION

Embodying systems and methods provide an application for a computing device, where the application is used in the nonintrusive commissioning of a smart fixture luminaire in an IPS to locate those lights or fixtures on an internal map of the structure covered by the IPS. The application can also remotely modify advertisement data of a visible light communication (VLC) enabled smart luminaire. VLC technology is generally used to broadcast a modulated pattern of light emitted by a smart luminaire that can be detected by a camera or other sensor (but generally not noticeable to the human eye). The modulated light can contain data such as the coordinates and/or position of the luminaire corresponding to the internal map of the structure. An embodying commissioning application can be implemented as a mobile communication device application, or ("app") on a computing device (e.g., personal computer, server based enterprise system, tablet, mobile computing devices, etc.).

Figure 1:
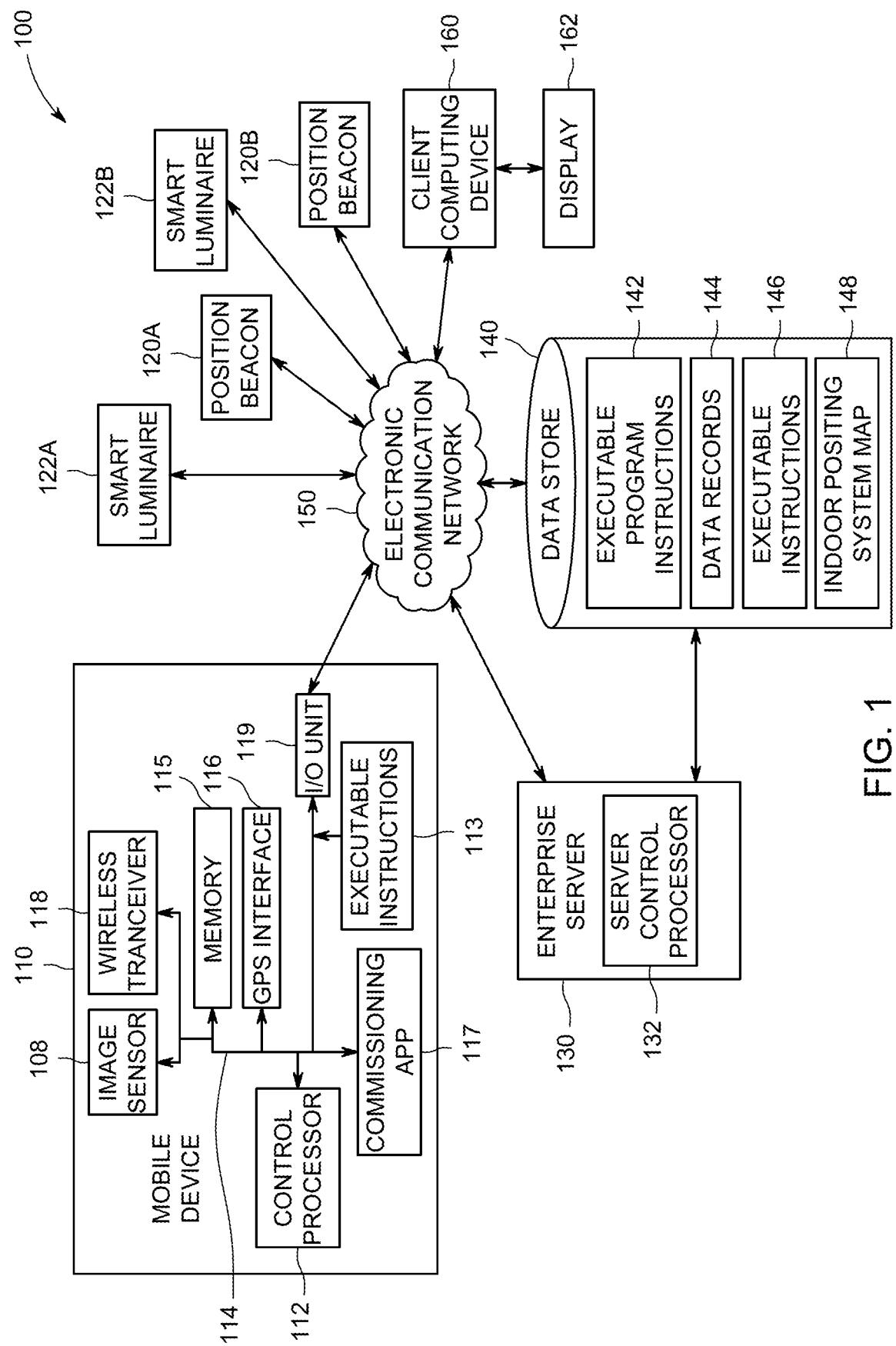
FIG. 1 depicts a system for commissioning elements of an indoor positioning system in accordance with an embodiment.

FIG. 1 depicts system 100 for commissioning elements of an IPS in accordance with embodiments. An embodying mobile device system includes mobile device 110, which can include mobile device control processor 112 that communicates with other components over internal data/control bus 114. Control processor 112 accesses computer executable instructions 113, which can be stored in memory 115 to implement commissioning app 117. The mobile device can include input/output (I/O) unit 119 that communicates across electronic communication network 150. Mobile device 110 can include wireless transceiver 118 capable of communication with one or more position beacons 120A, 120B that broadcast position beacons.

Position beacons 120A, 120B can be distributed about a volume of space (e.g., a retail store, office building, sporting arena, etc.). Associated with each position beacon is a corresponding smart luminaire 122A, 122B. The position beacon can be located in close proximity to the smart luminaire, or be integral with the smart luminaire itself.

Position beacons 120A, 120B can broadcast position beacon information via a short range wireless communication protocol (e.g., Bluetooth, low energy Bluetooth, iBeacon, near field communication, VLC, Airplay, etc.) for receipt by mobile device 110. In some implementations, the position beacons can communicate (wireless or hardwired) with system 100 across electronic communication network 150. In accordance with embodiments, the beacon information can be broadcast about simultaneously using both low energy Bluetooth and VLC wireless communication protocol.

Image sensor 108 (e.g., a camera) can include a light source (e.g., flash and/or lamp). Image sensor 108 can receive a VLC position beacon message to locate the smart luminaire(s) within the structure. The flash and/or lamp of the image sensor can be used to transmit a VLC message to the positioning beacons. In other implementations, wireless transceiver 118 can receive position beacons transmitted by wireless short-range communication technologies. The wireless transceiver can transmit messages to the position beacons 120A, 120B.

Control processor 112 may be a processing unit, a field programmable gate array, discrete analog circuitry, digital circuitry, an application specific integrated circuit, a digital signal processor, a reduced instruction set computer processor, etc.

Electronic communication network 150 can be, can comprise, or can be part of, a private internet protocol (IP) network, the Internet, an integrated services digital network (ISDN), integrated services digital network (ISDN), a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 150.

Coupled to electronic communication network 150 is enterprise server 130, which includes server control processor 132. Operation, communication and other functions of the enterprise server can be performed under the control of server control processor 132. Communicatively coupled to the enterprise server 130 is datastore 140 where executable program instructions 142 can be stored. Datastore 140 can include a repository of data records 144, executable applications 146, IPS map 148, and other items to be accessed by the enterprise server. In some embodiments, datastore 140 can be in communication with the electronic communication network.

In some implementations, system 100 can include client computing device 160 is coupled to communication network 150. The client computing device can be a personal computer, mobile device, tablet, smart terminal, etc. Connected to the client computing device is display 162. The client computing device includes video graphic components that are capable of displaying an interactive graphic user interface on the display.

Commissioning app 117 performs the commissioning of the smart luminaire to the IPS. A position beacon advertising a distinct smart luminaire can be received by the mobile device. The advertisement data can be broadcast over a short range wireless communication protocol by the position beacon associated with the smart luminaire.

After a pairing with a smart luminaire (for instance using Bluetooth low energy (BLE)) an authentication protocol is executed to verify the credentials of the device. Once authenticated, the advertisement data can be changed programmatically by commissioning app 117 through a service which may be exposed at a firmware level.

The advertisement data broadcast a smart luminaire can be in conformance with a variety of industry protocols. Embodying systems and methods are capable of adhering to the protocol(s) being implemented at the particular site. By way of example, a protocol can include three identification fields: a service field that can be unique to a particular organization/enterprise (e.g., Starbucks, Target, etc.); a facility field that identifies the particular location of the facility or site; and a position field that can identify the luminaire at that facility or site. One such protocol can be iBeacon. The commissioning app can assign a facility field (e.g., iBeacon Major ID) and a position field (e.g., iBeacon Minor ID) to a given luminaire. However, embodying systems and methods are not so limited and can accommodate a variety of industry protocols, which define the quantity and significance of these fields.

Additionally, the smart luminaires can be mapped to identification codes (IDs). An internal map of the structure can be displayed on the mobile device screen (or display 162 of client computer 160). The user can then position the mobile device in proximity to (e.g., about immediately below) the smart luminaire. The commissioning app can then decode a codeword advertised by the luminaire. Upon successful codeword decoding, the user may then assign the codeword to the smart luminaire which is on the map.

In accordance with embodiments, the commissioning application can identify the location of a non-commissioned smart luminaire (i.e., a smart luminaire without a position known to the IPS) based on a determination of the mobile device position within the structure. The position of the mobile device can be determined from beacon signals received from commissioned smart luminaires—i.e., luminaires having a location known to the IPS. The commissioning application can then locate the non-commissioned smart luminaire based on its proximity to the known position of the mobile device.

In accordance with embodiments, instead of being hard-coded, settings to modify advertisement data of smart luminaires may be set and read from user preferences. Such settings may include: firmware revision, identification fields, LED password, and the like.

Conventional commissioning typically requires that a smart luminaire be removed from its installation location (e.g., ceiling mounted, within a structure such as a gondola in a retail store aisle, wall mount, etc.), to be hard connected to a computer through an interface port to modify its advertisement data. Additionally, conventional approaches to locate the luminaire on the IPS map require determining the luminaire position in another manner.

In accordance with embodiments, commissioning app 117 modifies beacon advertisement data in a nonintrusive manner—i.e., without the need for physical contact with the smart luminaire, nor with the need to remove the luminaire from its mounting location. The commissioning app can also detect if a smart luminaire has an inadequate, or non-compliant codeword assigned to the luminaire. In accordance with embodiments, the commissioning app can implement the secure transmission of a valid encryption key to a smart luminaire before being allowed to modify the luminaire's advertisement data.

The luminaire codeword can be linked to a position of the luminaire on an IPS map by the commissioning app. Additionally, the commissioning app tracks assigned codewords to prevent assignment of the same codeword to multiple smart luminaires.

Figure 2:
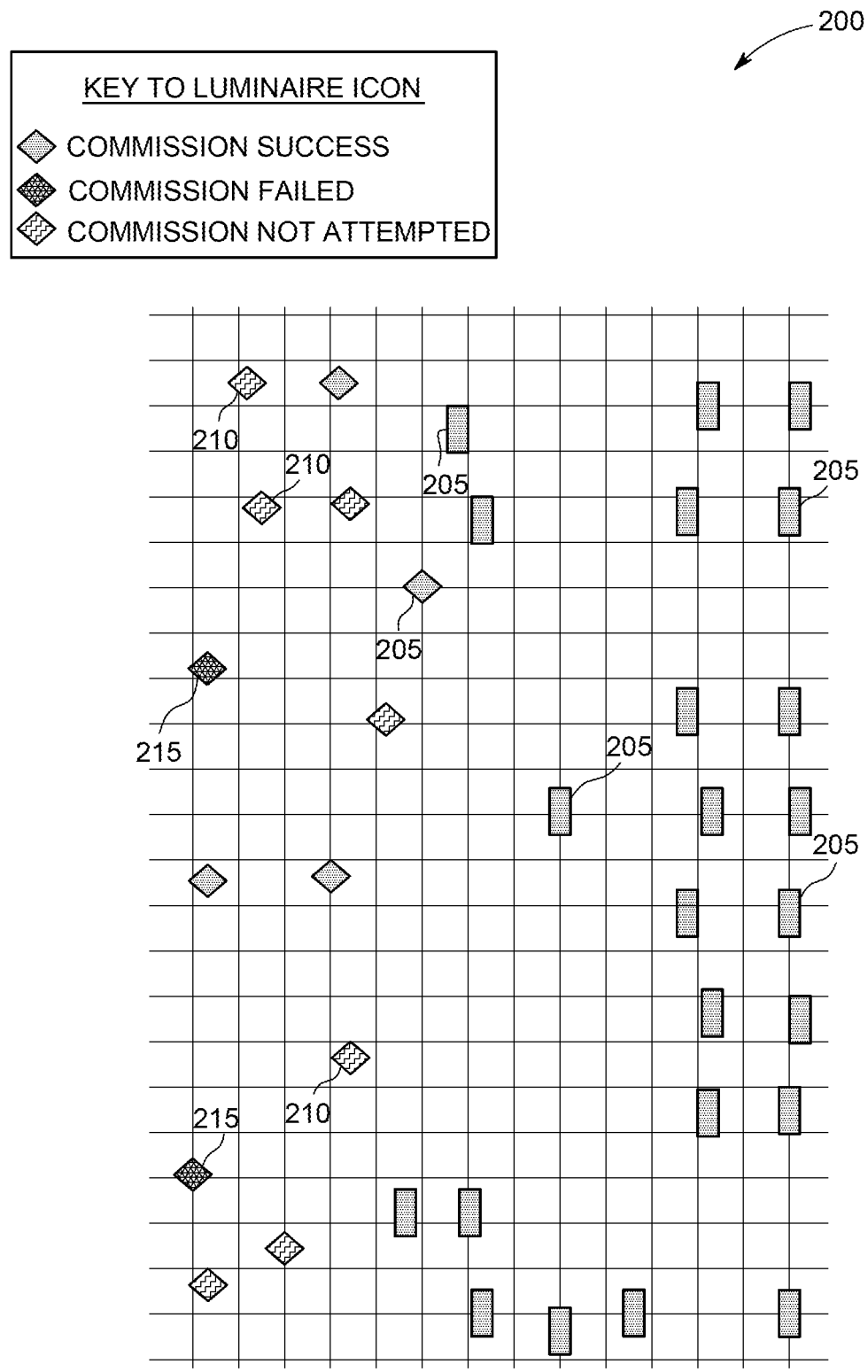
FIG. 2 depicts an indoor positioning system map in accordance with an embodiment.

FIG. 2 depicts IPS map 200 with multiple icons representing the position of smart luminaires within a structure. IPS map 200 can be displayed on the mobile device screen, or display 162. In the depicted implementation, IPS map 200 includes grid lines representing, for example, a coordinate system to locate positions within the structure on the map. In other implementations, IPS map 200 can include a layout of a floorplan for the structure. For example, an IPS map of a retail establishment can include shelving units, aisles, counters, open spaces, etc. A map can be provided for each floor of a multi-floor structure.

Smart luminaires are depicted by icons 205, 210, 215. The rectangular or diamond shape of each smart luminaire is representative of the smart luminaire's physical shape. Each smart luminaire includes an identification number within the icon.

Smart luminaires 205 are depicted on IPS map 200 in a first visual indicator (e.g., color or crosshatch pattern) to indicate that these smart luminaires are successfully commissioned into the IPS. Smart luminaires 210 are depicted on IPS map 200 in a second visual indicator (e.g., color or crosshatch pattern) to indicate that the commissioning of these smart luminaires has not yet been performed. Smart luminaires 215 are depicted on IPS map 200 in a third visual indicator (e.g., color or crosshatch pattern) to indicate that commissioning of these smart luminaires into the IPS failed.

In accordance with embodiments, the physical shape of the smart luminaire can be rendered in IPS map 200 using scalable vector graphic (SVG) technology. In accordance with embodiments, a human-readable text that transmits data objects consisting of attribute-value pairs (such as text in the JSON format) is converted into an image, such as an SVG image. The human-readable text can typically comprise information representative of the layout of a retail store. This layout information (departments, aisles, product locations, and the like) can be reconfigured in retail establishments to meet marketing and/or seasonal promotions.

A map of the structure can be dynamically regenerated from configuration files on demand, for example, each time a store administrator makes changes to the configuration files. The same or similar process can also be used to generate a map of the locations of luminaires, creating a rendering that has a dual map overlay (both luminaires and layout of the retail store).

In accordance with embodiments, the shape of one or more of the smart luminaires installed in the structure can be rendered on the IPS map. Position beacon 120A, 120B can transmit some of the map coordinates for its corresponding smart luminaire 122A, 122B. With three sets of map coordinates for a specific luminaire, the fourth coordinates of any quadrilateral light can be computed using an equation. These four luminaire coordinates can then be used to render/draw the distinct quadrilateral smart luminaire on the IPS map at its precise position. As can be readily understood, the rendering of the physical outline of a luminaire is not limited to quadrilateral shapes. To render a luminaire, one or more of its unknown coordinates needed for rendering can be computed from known coordinates. For example, a circular-shaped luminaire can be rendered by a single coordinate and a radius/diameter parameter.

Rendering of the actual luminaire shape on the IPS map provides an enhanced user experience, since the shape of the "virtual" (rendered) smart luminaires on the map may resemble the real one. The commissioning app is user friendly since the user does not need to specify all four valid coordinates if the luminaire is in the shape of a quadrilateral.

In accordance with embodiments, a user's location can be based on a unique identifier associated with smart luminaires within close proximity to the user. Should a user be transiting multiple floors of a structure, individual IPS maps for each floor can be accessed. The structure can be divided into multiple segments, and the smart luminaire commissioning can include major identification and minor identifications that correspond to the segments.

The unique aspects of the major identification and minor identification can be used to locate from the IPS map where in the structure a user is currently located. By receiving the position beacon advertised by the smart luminaire, the commissioning app can look-up the corresponding coordinates in the indoor position system map records 148 stored in datastore 140. Having identifies the location of the user within the structure, that location can be used to load the IPS map for that location. In accordance with implementations, a user that traverses large areas, or multiple floors, of a structure can obtain from the IPS map configurations corresponding to the current level, or area, of the structure by using the unique identifier(s) assigned to the smart luminaire.

Figure 3:
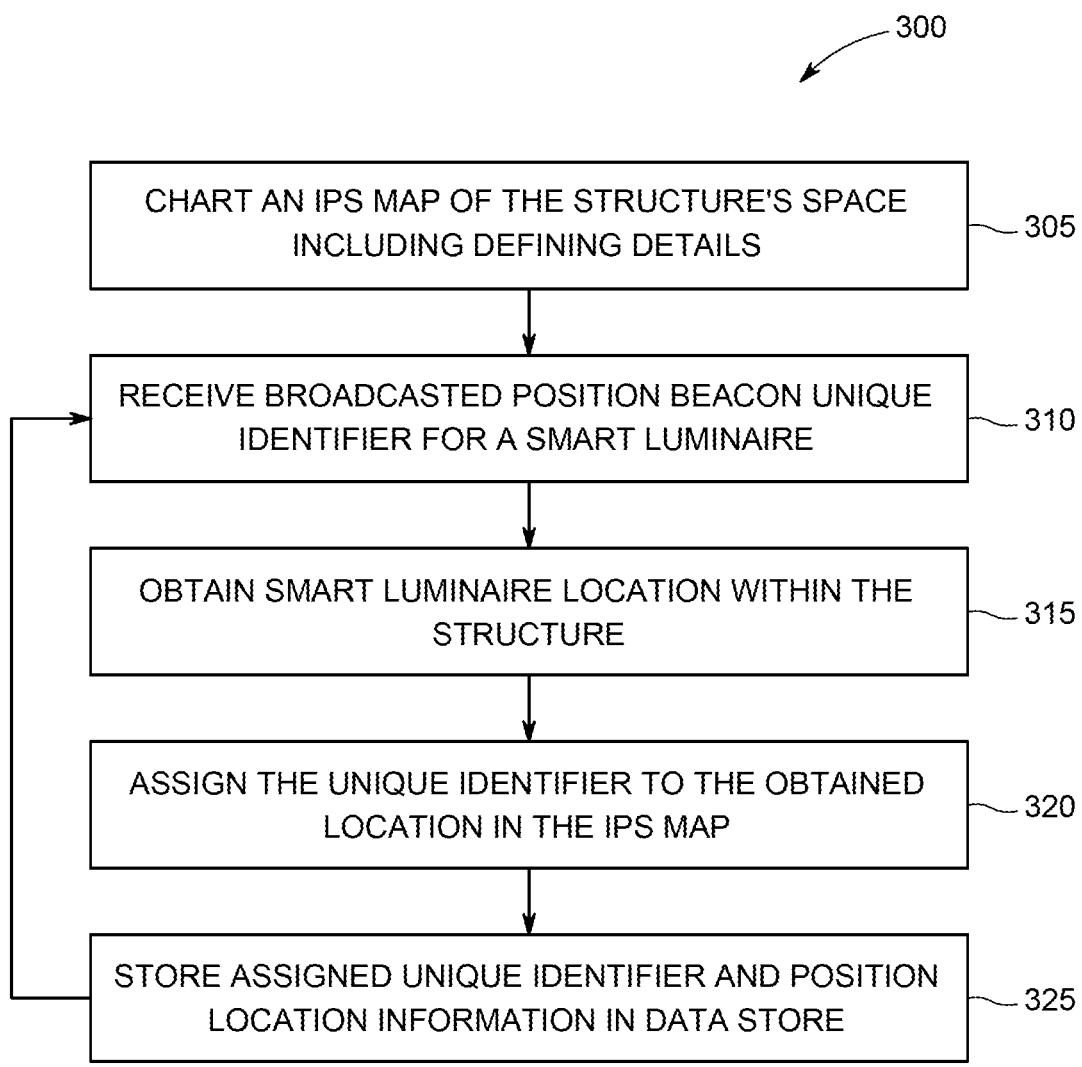
FIG. 3 depicts a flowchart for nonintrusive commissioning of smart luminaires to an indoor positioning system in accordance with an embodiment.

FIG. 3 depicts process 300 for the nonintrusive commissioning of smart luminaires to an indoor positioning system of a structure in accordance with an embodiment. Commissioning of the smart luminaires can be done using position beacon information broadcast over a (short and/or long range) wireless communication protocol.

An IPS map of the structure is charted, step 305. The IPS map can include a (two, or three, dimensional grid of the structure's space. This IPS map depicts details defining details of floorplan layout features of the structure, or a portion of its space. For example, the IPS map of a stadium could include seating chart, aisles, concourses, stage, ball court, etc. A retail space IPS map could include one or more of its departments, aisles, and product locations etc. The IPS map can be generated in commissioning app 117 by accessing structure layout blueprints electronically stored in datastore 140. The user can select illustrated features on the IPS map to insert labels. The map generation can be done via client computing device 160, or via mobile device 110.

In accordance with implementations, a first unique identifier can be entered into the smart luminaire prior to its being mounted/installed in the structure. By traversing the volume of the structure, position beacon information being broadcast/advertised by position beacons associated with smart luminaires is received, step 310. The position beacons can indicate their location using a short range wireless communication protocol. The position beacon(s) can be transmitted continuously, or at predetermined intervals. In some implementations, the position beacon can be transmitted in response to a low-power, wireless communication query generated by mobile device 110.

Obtain, step 315, the location of a given smart luminaire in the store, such as its two dimensional position in an x, y grid in the retail store. In some implementations, a z position indication can be obtained for luminaires not mounted on a ceiling. In accordance with embodiments, the smart luminaire location can be provided by user input through the mobile device. Other implementations can use the location(s) of smart luminaire(s) already known to the IPS to obtain the unknown location of a particular luminaire. For example, the trajectory path of the mobile device can be plotted on the IPS map based on the prior commissioning of luminaires in the vicinity of the particular luminaire.

The first unique identifier can be assigned, step 320, in the IPS map to the smart luminaire location obtained at step 310. Once the unique identifier is assigned to the smart luminaire at that map location, commissioning app 117 can identify the location of a mobile device based on the proximity of the mobile device to a particular broadcast beacon. The assigned unique identifier and obtained position location for the smart luminaire is stored, step 325, in IPS map records 148 of datastore 140. Process 300 continues at step 310, where the user moves along the structure to receive a broadcasted position beacon from another smart luminaire to be registered to the IPS map.

In accordance with some embodiments, a computer program application stored in non-volatile memory or computer-readable medium (e.g., register memory, processor cache, random access memory (RAM), read only memory (ROM), hard drive, flash memory, compact disc read only memory (CD-ROM), magnetic media, etc.) may include code or executable instructions that when executed may instruct and/or cause a controller or processor to perform methods discussed herein such as a method for the nonintrusive commissioning of smart luminaires to an indoor positioning system, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A system for commissioning a smart luminaire (122A, 122B) in an indoor positioning system (100), the system comprising:
   a mobile device (110) including a mobile device control processor (112) in communication with a commissioning application (117);
   the commissioning application configured to communicate with one or more position beacons (120A, 120B) distributed throughout a spatial volume of a structure;
   the one or more position beacons configured to broadcast a unique identifier within the spatial volume via a wireless communication protocol, and to receive a transmission from the mobile device;
   a wireless transceiver (118) in the mobile device configured to receive the broadcasted positions, and to transmit data to the one or more position beacons;
   the commissioning application configured to authenticate itself to the position beacon, and to programmatically change the unique identifier;
   the commissioning application configured to identify a location of a non-commissioned smart luminaire having a position unknown to the indoor positioning system, the non-commissioned smart luminaire location based on a proximity to a known position of the mobile device;
   the commissioning application configured to link a codeword broadcast by the smart luminaire to a position on an internal map of the structure viewable on a display of the mobile device; and
   based on a determination that the broadcasted codeword is inadequate, the commissioning application configured to provide a valid encryption key to the smart luminaire via a secure transmission.

2. The system of claim 1, including each of the one or more position beacons associated with a respective smart luminaire, and located in one of close proximity to and as an integral part of the smart luminaire.

3. The system of claim 1, including the wireless communication protocol being one of Bluetooth, low energy Bluetooth, iBeacon, near field communication, visible light communication, and airplay.

4. The system of claim 1, including the beacons configured to broadcast the unique identifier simultaneously using low energy Bluetooth and visible light communication wireless communication protocols.

5. The system of claim 1, including the mobile device including an image sensor (108) to conduct the visible light communication.

6. The system of claim 5, including the image sensor having a light source to transmit a visible light communication to the smart luminaire.

7. The system of claim 1, including the commissioning application providing mapping data to the indoor positioning system, the mapping data locating a position of the smart luminaire on a map of the spatial volume.

8. The system of claim 1, including the commissioning application configured to locate the position of the mobile device on a map of the spatial volume presented on a mobile device display, the mobile device position based on a received broadcast from the positioning beacon.

9. The system of claim 1, including the commissioning application configured to identify the known position of the mobile device, the mobile device known position determined from beacon signals received from one or more commissioned smart luminaires.

10. A method for commissioning a smart luminaire (122A, 122B) in an indoor positioning system (100), the method comprising:
    providing a commissioning application (117) for a mobile device (110), the commissioning application configured to commission one or more position beacons (120A, 120B) distributed throughout a spatial volume of a structure;
    charting an indoor positioning system map (200) of at least a portion of the spatial volume;
    receiving at the commissioning application a broadcast beacon identifier from the one or more position beacons;
    selecting in the commissioning application a location of the smart luminaire within the spatial volume;
    associating the broadcast beacon identifier and the smart luminaire location in a data store record;
    the commissioning application identifying a location of a non-commissioned smart luminaire having a position unknown to the indoor positioning system, the non-commissioned smart luminaire location based on a proximity to a known position of the mobile device;
    the commissioning application linking a codeword broadcast by the smart luminaire to a position on the indoor positioning system map viewable on a display of the mobile device; and
    based on a determination that the broadcasted codeword is inadequate, the commissioning application providing a valid encryption key to the smart luminaire via a secure transmission.

11. The method of claim 10, including the indoor positioning system map including defining details of a floorplan layout of the structure.

12. The method of claim 10, including the broadcast beacons being transmitted via a wireless communication protocol.

13. The method of claim 12, including the broadcast beacons broadcasting the unique identifier simultaneously using low energy Bluetooth and visible light communication wireless communication protocols.

14. The method of claim 10, including the commissioning application assigning and then transmitting the unique identifier to the one or more position beacon.

15. The method of claim 10, including associating each of the one or more position beacons associated with a respective smart luminaire.

16. The method of claim 10, including the commissioning application identifying the known position of the mobile device, the mobile device known position determined from beacon signals received from one or more commissioned smart luminaires.

17. The method of claim 10, including authenticating the commissioning application to the position beacon, and programmatically changing the unique identifier.

18. A non-transitory computer readable medium containing computer-readable instructions stored therein for causing a control processor to perform operations of commissioning a smart luminaire (122A, 122B) in an indoor positioning system (100), the operations comprising:

providing a commissioning application (117) for a mobile device (110), the commissioning application configured to commission one or more position beacons (120A, 120B) distributed throughout a spatial volume of a structure;

charting an indoor positioning system map (200) of at least a portion of the spatial volume;

receiving at the commissioning application a broadcast beacon identifier from the one or more position beacons;

selecting in the commissioning application a location of the smart luminaire within the spatial volume; and associating the broadcast beacon identifier and the smart luminaire location in a data store record;

the commissioning application identifying a location of a non-commissioned smart luminaire having a position unknown to the indoor positioning system, the non-commissioned smart luminaire location based on a proximity to a known position of the mobile device;

the commissioning application linking a codeword broadcast by the smart luminaire to a position on the indoor positioning system map viewable on a display of the mobile device; and based on a determination that the broadcasted codeword is inadequate, the commissioning application providing a valid encryption key to the smart luminaire via a secure transmission.

19. The non-transitory computer readable medium of claim 18, including executable instructions that cause the control processor to control the one or more position beacons to broadcast a unique identifier simultaneously using low energy Bluetooth and visible light communication wireless communication protocols.

20. The non-transitory computer readable medium of claim 18, including executable instructions that cause the control processor to transmit an assigned unique identifier to the position beacon.

21. The non-transitory computer readable medium of claim 18, including executable instructions that cause the control processor to perform the step of the commissioning application identifying the known position of the mobile device, the mobile device known position determined from beacon signals received from one or more commissioned smart luminaires.

22. The non-transitory computer readable medium of claim 18, including executable instructions that cause the control processor to perform the step of authenticating the commissioning application to the position beacon, and programmatically changing the unique identifier.

* * * * *